(12) United States Patent
Kim

(10) Patent No.: US 9,181,846 B2
(45) Date of Patent: Nov. 10, 2015

(54) FLEXIBLE TUBE FOR EXHAUST PIPE OF AUTOMOBILES

(71) Applicant: SJM Co., Ltd., Gyeonggi-do (KR)

(72) Inventor: Kyeong Jung Kim, Gyeonggi-do (KR)

(73) Assignee: SJM Co., Ltd., Gyeonggi-do (KR)

( * ) Notice: Subject to any disclaimer, the term of this patent is extended or adjusted under 35 U.S.C. 154(b) by 56 days.

(21) Appl. No.: 14/145,015

(22) Filed: Dec. 31, 2013

(65) Prior Publication Data

US 2014/0261842 A1    Sep. 18, 2014

(30) Foreign Application Priority Data

Mar. 12, 2013  (KR) .................. 10-2013-0026270

(51) Int. Cl.

| | |
|---|---|
| F16L 11/00 | (2006.01) |
| F16L 9/14 | (2006.01) |
| F16L 9/00 | (2006.01) |
| F01N 13/08 | (2010.01) |
| F16L 11/15 | (2006.01) |
| F16L 27/111 | (2006.01) |
| F16L 51/02 | (2006.01) |
| F01N 13/18 | (2010.01) |

(52) U.S. Cl.
CPC ............ *F01N 13/08* (2013.01); *F01N 13/1811* (2013.01); *F01N 13/1816* (2013.01); *F16L 11/15* (2013.01); *F16L 27/111* (2013.01); *F16L 51/027* (2013.01)

(58) Field of Classification Search
CPC ............... F16L 9/02; F16L 9/06; F16L 11/11; F16L 11/15
USPC .......................................... 138/121, 173, 149
See application file for complete search history.

(56) References Cited

U.S. PATENT DOCUMENTS

| 1,547,431 | A | * | 7/1925 | Mallory ............................ 92/34 |
|---|---|---|---|---|
| 2,930,007 | A | * | 3/1960 | Thompson et al. ........... 333/241 |
| 5,311,912 | A | * | 5/1994 | Hayward ...................... 138/121 |
| 5,660,419 | A | * | 8/1997 | Kim ............................... 285/226 |
| 5,901,754 | A | * | 5/1999 | Elsasser et al. ............... 138/118 |
| 6,085,797 | A | * | 7/2000 | Grabaum et al. ............. 138/121 |
| 6,125,889 | A | * | 10/2000 | Elsasser et al. ............... 138/118 |
| 6,164,703 | A | * | 12/2000 | Kim ............................... 285/49 |
| 6,230,748 | B1 | * | 5/2001 | Krawietz et al. ............. 138/121 |
| 6,324,837 | B1 | * | 12/2001 | Jenne et al. .................... 60/322 |
| 6,902,203 | B2 | * | 6/2005 | Kang ............................ 285/226 |
| 2003/0137147 | A1 | * | 7/2003 | Girot et al. ...................... 285/47 |
| 2003/0150502 | A1 | * | 8/2003 | Nagai ........................... 138/121 |
| 2009/0114303 | A1 | * | 5/2009 | Kim ............................... 138/121 |
| 2011/0073209 | A1 | * | 3/2011 | Eguchi et al. ................ 138/121 |

\* cited by examiner

*Primary Examiner* — Paul R Durand
*Assistant Examiner* — Vishal Pancholi
(74) *Attorney, Agent, or Firm* — Kirton McConkie; Evan R. Witt

(57) ABSTRACT

A flexible tube for an exhaust pipe of an automobile includes a bellows member having corrugations thereon; an interlocking member positioned in the bellows member with a predetermined gap from the bellows member and having a spiral groove formed thereon to absorb deformation; a braid member positioned to surround the outside portion of the bellows member and braided to be flexibly deformed with a large displacement with respect to a displacement and tension in a compression direction; cap members coupled for fixing the braid member on the outside of the both ends of the bellows member; and intermediate members formed in the shape of a ring and having one end fixed to the bellows member and the other end fixed to the interlocking member by overlapping the interlocking member inwards, wherein the bellows member has protrusion portions, a center part and both end parts.

4 Claims, 3 Drawing Sheets

FLEXIBLE TUBE FOR EXHAUST PIPE OF AUTOMOBILES

BACKGROUND OF THE INVENTION

1. Field of the Invention

The present invention relates to a flexible tube for an exhaust pipe of an automobile, and more particularly to, a flexible tube for an exhaust pipe of an automobile, wherein a depression inner diameter in the center of a bellows is formed to be larger than a depression inner diameter at both sides of the bellows such that a gap from an interlocking member increases so as to prevent the interference between the bellows and the interlocking member, thereby improving traveling noise, while both end parts have a small gap so as to increase the height of protrusions, thereby improving the flexibility and durability of the bellows.

2. Description of the Related Art

In general, an exhaust pipe is connected to the engine of an automobile so as to discharge exhaust gas, wherein a flexible coupling is mounted on the connection portion thereof such that the flexible coupling absorbs external force which is generated from the vibration of the engine and the vibration of the surface of a road so as to extend the lifespan of the exhaust pipe and to improve the ride comfort.

The flexible coupling which is connected to the exhaust pipe of an automobile as above generally absorbs the tension, compression and bending displacement which are generated in response to the movement of an exhaust system from the engine vibration and the road surface vibration, wherein torsion displacement generated in every direction may follow according to the mounting conditions of the engine, the direction where the displacement generates, and the design and shape of the entire exhaust pipe.

Therefore, a bellows made from a metal material is mainly used in order to improve the performances for maintaining airtightness and absorbing vibration and displacement, which are the core functions of the flexible coupling for an exhaust pipe of an automobile.

In addition, the flexible coupling is provided with an interlocking member as disclosed in EP 041089 A1, such that the interlocking member simultaneously absorbs the inward axial deformation, bending deformation or the like of a bellows member which is made from a metal material in the shape of a cylinder with repetitive corrugations, controls displacement within the range of elastic limit of the bellows member, makes the flow of exhaust gas smooth as a guide pipe, and protects the bellows member from the exhaust gas of high temperature.

Further, the bellow member is formed in a structure, wherein the outside portion of the bellows member is surrounded by a braid member and, in this situation, the both ends of the bellows member and the braid member are compressed together with caps in the circumferential direction so as to be finished by spot-welding.

That is, one end is coupled to an engine side and the other end is coupled to an exhaust pipe side such that the exhaust gas passes through a center portion and the bellows member and the interlocking member absorb shocks, deformation or the like which acts between the engine and the exhaust pipe via contraction and expansion.

Problem to be Solved by the Invention

The currently widely used bellows member has a disadvantage that the bellows member cannot sufficiently serve as a means for restraining the tension, compression and bending displacement caused by the vibration of an engine or the vibration of an exhaust system which is applied from the surface of a road while traveling, since the outer diameter and the inner diameter of the bellows member are formed to be uniform so that the height of all protrusions is uniform or the height of just a first depression portion is lowered.

Therefore, as for the flexible coupling, Korean Utility Model Registration Number 184089 discloses a flexible coupling for an automobile exhaust pipe as a means for extending the lifespan of a bellows and transmitting and dispersing the vibration of an engine and the vibration and stress generated during traveling.

According to this flexible coupling for an automobile exhaust pipe, as shown in FIG. 6, heights H1-H4 of protrusions gradually increase from a first protrusion at an end portion 11 side of a bellows member 10 to the other side and the inner diameter of the depression portion is formed to gradually decrease from a first depression portion side to the other side at a uniform angle such that the flexible coupling absorbs displacement with respect to the axial direction or the bending direction of the braid member 10 and then is restored when external force is removed.

Further, the depression portion minimum inner diameter Dr of the bellows member 10 is formed to be equal to or larger than the inner diameter Dt of the end portions 11.

However, the bellows member as described above has disadvantages that manufacturing costs increase and manufacturing work thereof is complicated since the bellows member is made from a metal material with repetitively formed protrusions and depressions, wherein the height of the protrusions gradually increases towards a center part in the inward direction such that the inner diameter of the depressions gradually decreases.

Furthermore, the minimum inner diameter of the center part of the bellows member is smaller than the diameter of the both end parts thereof such that the flow of exhaust gas stays in the center part at the time of the discharge of the exhaust gas, thereby degrading engine performances.

In particular, a sufficient gap is secured between the interlocking member and the bellows member so as to prevent damage to the bellows member or the generation of abnormal sound resulted from mutual interference, in spite of vibration or the like. However, the forming of such a sufficient gap causes the decrease of the height of the protrusions of the bellows member such that the durability of the bellows member becomes decreased or the abnormal sound may be generated.

That is, the vibration applied to the flexible tube in the exhaust system of an automobile is much serious in the center part rather than at the both end parts such that a sufficient gap is secured between the interlocking member and the bellows member. However, the bellows member as described above has the center part of which inner diameter is the same as that of the center part of the conventional bellows member. Therefore, the center part where the serious vibration is applied cannot prevent the interference between the interlocking member and the bellows member with respect to the vibration or the like.

PRIOR ART DOCUMENT

Patent Document

Patent Document 1
Korean Utility Model Registration Number 184089-"flexible coupling for an automobile exhaust pipe", registered on 20 Mar. 2000

SUMMARY OF THE INVENTION

The present invention has been made to solve the above-mentioned problems of the related art, and an objective of the invention is to provide a flexible tube for an exhaust pipe of an automobile, wherein the depression inner diameter of a center part in a bellows member, where vibration is seriously generated, is formed to be larger than the depression inner diameter of both end parts, where vibration is rather smaller than that of the center part, such that a sufficient gap is maintained between the bellows member and an interlocking member so as to improve the durability of the bellows member.

Another objective of the present invention is to provide a flexible tube for an exhaust pipe of an automobile, wherein a reinforcement section is further provided to the center part of a bellows member in the axial direction so as to further absorb the external force and displacement applied to the bellows member, thereby improving the flexibility and durability of the bellows member.

Still another objective of the present invention is to provide a flexible tube for an exhaust pipe of an automobile, wherein the depression portions of the center portion of the bellows member are higher than the depression portions of the both end parts so as to reduce material costs of the bellows members and improve productivity, while reducing the vibration of the center part so as to improve the vibration properties, thereby improving marketability and reliability of the bellows member.

In order to achieve the above mentioned objectives, a flexible tube for an exhaust pipe of an automobile, comprises:

a bellows member 10 made from a metal material, formed in the shape of a hollow cylinder, and having corrugations which are repetitively formed in a wave form on the bellows member 10;

an interlocking member 20 positioned in the bellows member 10 with a predetermined gap from the bellows member 10 and having a spiral groove spirally formed on the interlocking member 20 so as to absorb deformation;

a braid member 30 positioned such that the braid member 30 surrounds the outside portion of the bellows member 10 and is braided such that the braid member 30 may be flexibly deformed with a large displacement with respect to a displacement and tension in a compression direction;

cap members 40 coupled such that the braid member 30 is fixed to the outside portions of the both ends of the bellows member 10; and intermediate members 50 formed in the shape of a ring, of which one end is fixed to the bellows member 10 and the other end is fixed to the interlocking member 20 by overlapping the interlocking member 20 inwards, wherein the bellows member 10 has protrusion portions 12, a center part C and both end parts U such that the protrusion portions 12 have a uniform outer diameter, the center part C has a maximum depression inner diameter D3, both end parts U have a minimum depression inner diameter D1, and the maximum depression inner diameter D3 of the center part C is formed to be larger than the minimum depression inner diameter D1 of the both end parts U.

Further, the bellows member 10 has a depression inner diameter D2 which is formed such that depression portions 13 gradually increase from the minimum depression inner diameter D1 of the both end parts U to the center part C in the outward direction, and a maximum depression inner diameter D3 which is uniformly formed in the center.

Furthermore, the center part C of the bellows member 10 further includes reinforcement sections S, wherein the reinforcement section S is formed with low protrusion portions 12a and low depression portions 13a, of which height is lower than the protrusion portions 12 and the depression portions 13 which are uniformly repeated.

Furthermore, the inner diameter of the center part C gradually increases at a uniform angle from the minimum depression inner diameter D1 of the both end parts U of the bellows part 10 to the maximum depression inner diameter D3, and the center part C of the bellows member 10 further includes the reinforcement sections S which are formed in the shape of a ring and have the low protrusion portions 12a and the low depression portions 13a, of which height is lower than the protrusion portions 12 and the depression portions 13 which are uniformly repeated.

Effect of the Invention

According to the present invention as structured above, the maximum depression inner diameter of a center part in a bellows member, where vibration is seriously generated, is formed to be larger than the minimum depression inner diameter of both end parts, where vibration is rather smaller than that of the center part, such that a sufficient gap is maintained between the bellows member and an interlocking member in spite of vibration or the like so as to improve the lifespan of the bellows member.

Further, in order to prevent interference between the bellows member and the interlocking member, the depression portion diameter of the center part is formed to be large while the depression portion diameter of the both end parts, where vibration is relatively small, is formed to be small, such that the height of the protrusions of the both end parts may be highly formed so as to improve flexibility while dispersing the external force and displacement applied to the bellows member, thereby improving the durability of the bellows member.

Furthermore, the depression inner diameter of the center part of the bellows member is higher than the depression inner diameter of the both end parts such that the flow of exhaust gas may be smooth, the material costs of the bellows member may be reduced, and the productivity may be improved, thereby improving the marketability and reliability of the bellows member.

DESCRIPTION OF REFERENCE NUMERALS

Figure 1:
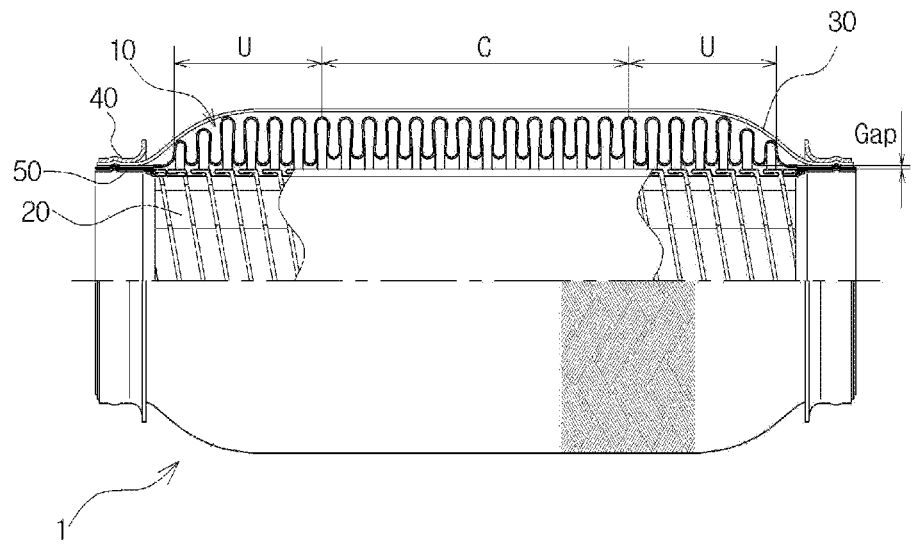
FIG. 1 is a half-sectional view showing the basic structure of a flexible tube for an exhaust pipe of an automobile according to one embodiment of the present invention.

Reference numerals used to identify various structural elements in the drawings include:
1—flexible tube for exhaust pipe
10—bellows member
12—protrusion portion
12a—low protrusion portion
13—depression portion
13a—low depression portion
20—interlocking member
30—braid member
40—cap member
50—intermediate member
C: center part
U: both end parts
S: reinforcement section
D1—minimum depression inner diameter
D3—maximum depression inner diameter

DETAILED DESCRIPTION OF THE PREFERRED EMBODIMENTS

Hereinafter, the present invention will be described in greater detail by reference to the drawings. However, the present invention should not be construed as being limited thereto.

In a flexible tube for an exhaust pipe of an automobile according to the present invention, the depression inner diameter of the center part of a bellows member is formed to be larger than the depression inner diameter of both end parts so as to increase a gap from an interlocking member, such that the interference between the bellows member and the interlocking member may be prevented. The depression portions of the both end parts are formed to be small so as to flexibly absorb external force and displacement applied to the bellows member such that the flexibility and durability of the bellows member may be improved.

First of all, a flexible tube 1 for an exhaust pipe according to the present invention principally includes a bellows member 10 formed in the shape of a hollow cylinder and having corrugations which are repetitively formed in a wave form thereon, an interlocking member 20 positioned in the bellows member 10 with a predetermined gap maintained from the bellows member 10, a braid member 30 for surrounding the outside portion of the bellows member 10, cap members 40 for fixing the braid member 30 to the outside portions of the both ends of the bellows member 10, and intermediate members 50 having one end fixed to the bellows member 10 and the other end fixed to the interlocking member 20 by overlapping the interlocking member 20 inwards, wherein it is important to sufficiently maintain the gap from the interlocking member 20 by forming the maximum depression inner diameter D3 of the center part C to be larger than the minimum depression inner diameter D1 of the both end parts U.

To this end, referring to FIG. 1 which shows the approximate directions used in the description, the bellows member 10 is made from a metal material in the shape of a cylinder, wherein the bellows member 10 is provided with corrugations in a wave form by protrusion portions 12 and depression portions 13 which are continuously formed in the lengthwise direction. Therefore, as vibration or shocks in the axial direction or displacement in the bending direction is generated, the protrusion portions 12 and the depression portions 13 which are continuously formed in the lengthwise direction serve to absorb the displacement by being elastically bent, to prevent the leakage of exhaust gas and to absorb extension and bending. The protrusion portions 12 and the depression portions 13 are restored after the displacement is absorbed and the external force is removed.

Further, the interlocking member 20 is positioned in the bellows member 10 while maintaining a predetermined gap from the bellows member 10.

The interlocking member 20 has a spiral groove which is spirally formed throughout the interlocking member 20 such that the damping effect is generated by the friction in the spiral groove at the time of the axial or bending displacement is generated, wherein the spiral groove mainly absorbs the deformation in the lengthwise direction and maintains the space of a path through which the exhaust gas passes, thereby serving to restrain the generation of turbulence.

The braid member 30 is braided with a thin metal wire and surrounds the outside of the bellows member 10. Therefore, the bellows member 10 may be flexibly deformed with a large displacement even with respect to the displacement and tension in the compression direction. The braid member 30 and the both end parts of the outside of the bellows member 10 are coupled with the cap members 40 such that the bellows member 10 is fixed to the braid member 30.

Meanwhile, the bellows member 10 and the interlocking member 20 are connected to each other by the intermediate members 50 which are formed in the shape of a ring.

That is, in the state that the front ends of the intermediate members 50 are aligned in accordance with the end portions of the bellows member 10 and the horizontal portions of the bellows member 10, the braid member 30 and the cap members 40 are mutually overlapped and the intermediate members 50 and the bellows member 10 are attached to each other by clamping means which have fastening function in the circumferential direction or by carrying out spot-welding on several points.

Further, the other ends of the intermediate members 50 are partially overlapped by the interlocking member 20 in the state that the other ends of the intermediate members 50 are folded towards the inside of the interlocking member 20, and then the spot-welding is carried out on several points such that the bellows member and the interlocking member 20 are maintained in a completely coupled state.

Figure 2:
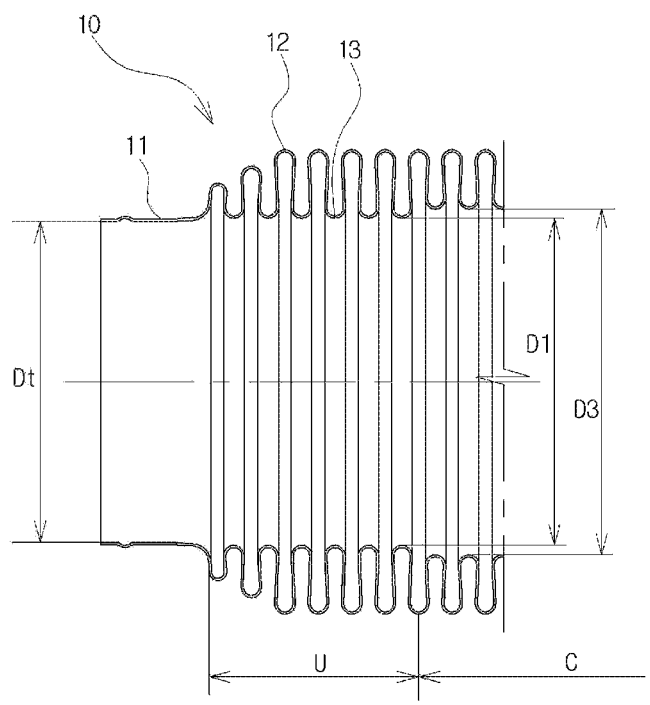
FIG. 2 is an expanded sectional view showing the structure of a bellows member according to the present invention.

At this time, the bellows member 10 according to the present invention has, as shown in FIG. 2, a uniform outer diameter of the protrusion portions 12, and the maximum depression inner diameter D3 of the center part C is formed to be larger than the minimum depression inner diameter D1 of the both end parts U.

That is, the bellows member 10 has the maximum depression inner diameter D3 of the center part C which is formed to be larger than the minimum depression inner diameter D1 of the both end parts U and the protrusion portions 12 are continuously formed in the lengthwise direction with the same height, in the state that the minimum depression inner diameter D1 of the both end parts U is formed to be equal to or larger than the inner diameter Dt of the end portions 11.

Therefore, the bellows member 10 may maintain the same gap as the conventional one between the interlocking member 20, which is positioned in the bellows member 10, and the both end parts U and a larger gap than the conventional one between the interlocking member 20 and the center part C.

If the displacement in the axial direction or the bending direction is generated in the bellows member 10 and the interlocking member 20 due to the vibration or shocks, displacement is generated more seriously in the center part C of the bellows member 10 rather than in the both end parts U. However, the center part C according to the present invention maintains a sufficient gap from the interlocking member 20 such that the damage to the bellows member 10 by the interlocking member 20 may be prevented.

To the contrary, a minimum gap is maintained from the interlocking member 20 to the both end parts U of the bellows member 10, where the vibration is not serious. Therefore, the height of the protrusions of the both end parts U may be high, improving the flexibility and durability of the bellows member.

Figure 3:
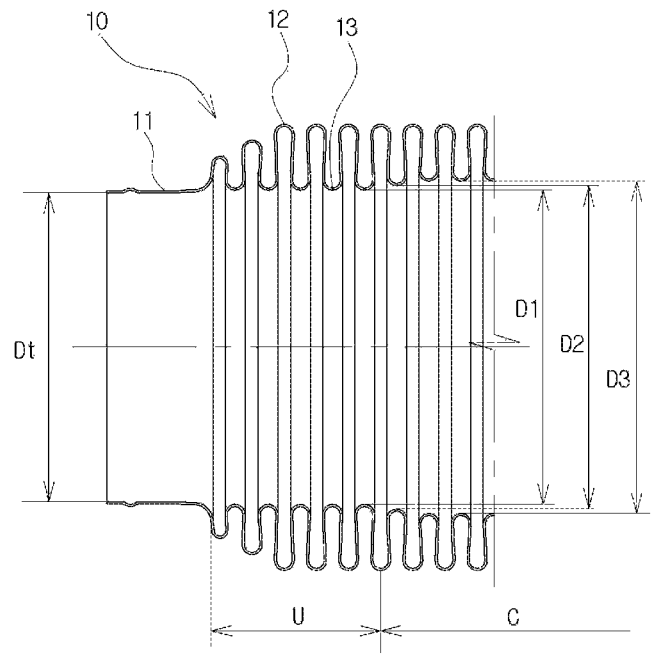
FIG. 3 to FIG. 5 are expanded sectional views showing flexible tubes for an exhaust pipe of an automobile according to other embodiments of the present invention.

Further, the bellows member 10 according to another embodiment, as shown in FIG. 3, has a depression inner diameter D2 which gradually increases from the minimum depression inner diameter D1 of the both end parts U to the center part C, and a uniform maximum depression inner diameter D3 in the center.

As described above, by forming a predetermined inclination from the both end parts U of the bellows member 10 to the center part C, the bellows member 10 may be guided with an inclination with respect to the bending displacement such that the concentration of the stress generated by a sharp change of shape may be prevented and smooth movement may be secured.

Meanwhile, 5-25° is usually employed as a basis for the inclination of the inclined depression portions 13, and the number of the inclined depression portions is preferably set to 1-3.

Figure 4:
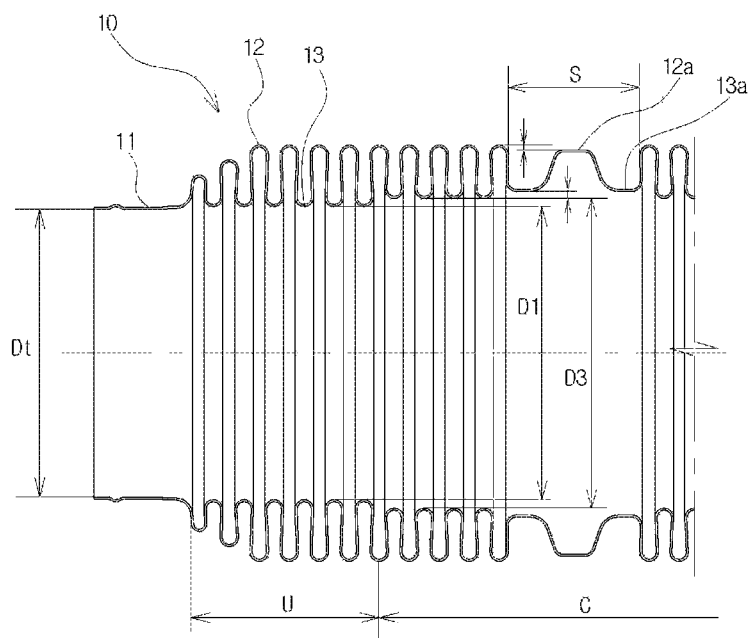

Further, as shown in FIG. 4, the center part C of the bellows member 10 further includes reinforcement sections S which are formed with low protrusion portions 12a and low depression portions 13a, of which height is lower than the protrusion portions 12 and the depression portions 13 which are uniformly repeated.

Figure 5:
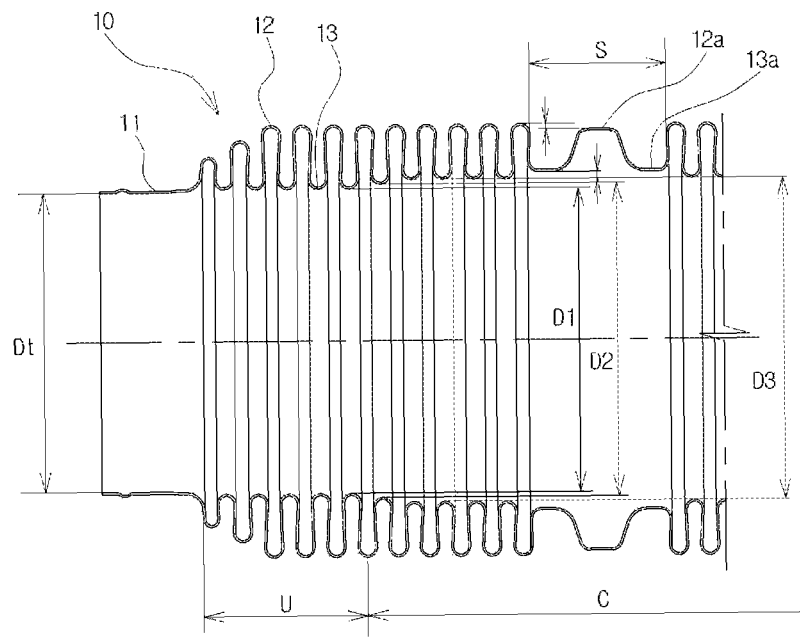
Figure 6:
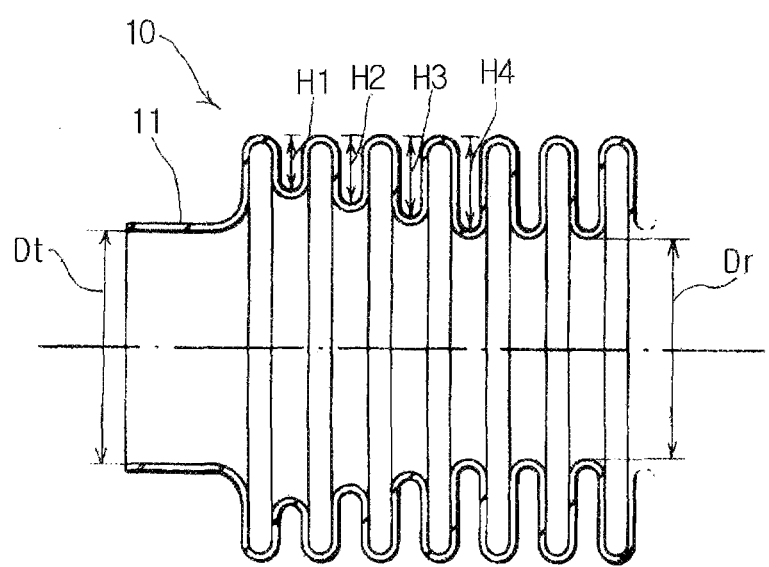
FIG. 6 is a half-sectional view showing the structure of a prior art bellows member.

Furthermore, as shown in FIG. 5, the inner diameter of the center part C gradually increases at a uniform angle from the inner diameter of the depression portions 13 of the both end parts U of the bellows part 10 to the inner diameter of the depression portions 13 of the center part C, and the center part C further includes the reinforcement sections S which are formed in the shape of a ring and have the low protrusion portions 12a and the low depression portions 13a, of which height is lower than the protrusion portions 12 and the depression portions 13 which are uniformly repeated.

The reinforcement sections S have advantages, wherein 2~5 protrusions of the center part C of the bellows member 10 may be omitted, thereby reducing the consumption of materials so as to reduce manufacturing costs.

Having described our invention as related to the present embodiments, it is our intention that the invention not be limited by any of the embodiments and drawings of the description, and it is apparent to those skilled in the art that various changes and modifications of the present invention may be made without departing the spirit and scope of the invention.

What is claimed is:

1. A flexible tube for an exhaust pipe of an automobile, comprising:
    a bellows member made from a metal material, formed in the shape of a hollow cylinder, and having corrugations which are repetitively formed in a wave form on the bellows member, wherein the bellows member is provided with a center part and two end parts;
    an interlocking member positioned in the bellows member with a predetermined gap between the interlocking member and the bellows member and wherein the interlocking member has a spiral groove spirally formed thereon to absorb deformation;
    a braid member positioned such that the braid member surrounds the outside portion of the bellows member and is braided such that the braid member may be flexibly deformed with a large displacement with respect to a displacement and tension in a compression direction;
    cap members coupled such that the braid member is fixed to outside portions of both end parts of the bellows member; and
    intermediate members formed in the shape of a ring, each of which has one end thereof fixed to the bellows member and another other end thereof fixed to the interlocking member by overlapping the interlocking member inwards,
    wherein the bellows member has protrusion portions on the center part and both end parts, wherein the protrusion portions on the center part are uniformly and repetitively formed at their outer and inner diameters and wherein the protrusion portions on the center part have a maximum depression inner diameter D3 and the protrusion portions on both end parts have a minimum depression inner diameter D1, and wherein the maximum depression inner diameter D3 of the center part protrusion portions is larger than the minimum depression inner diameter D1 of the protrusion portions of both end parts, such that the gap between the interlocking member and the bellows member is larger at the center part compared to both end parts.

2. The flexible tube for an exhaust pipe of an automobile according to claim 1, wherein the bellows member is configured to form an intermediate depression inner diameter D2 between the maximum depression inner diameter D3 of the center part and the minimum depression inner diameter D1 of both end parts.

3. The flexible tube for an exhaust pipe of an automobile according to claim 1, wherein the center part of the bellows member further includes reinforcement sections formed with low protrusion portions and low depression portions, of which height is lower than the protrusion portions and the depression portions of the center parts which are uniformly repeated.

4. The flexible tube for an exhaust pipe of an automobile according to claim 2, wherein the center part of the bellows member further includes reinforcement sections formed in the shape of a ring having the low protrusion portions and low depression portions, the heights of which are lower than those of the protrusion portions and the depression portions of the center parts to be uniformly repeated.

* * * * *